United States Patent Office 3,197,519
Patented July 27, 1965

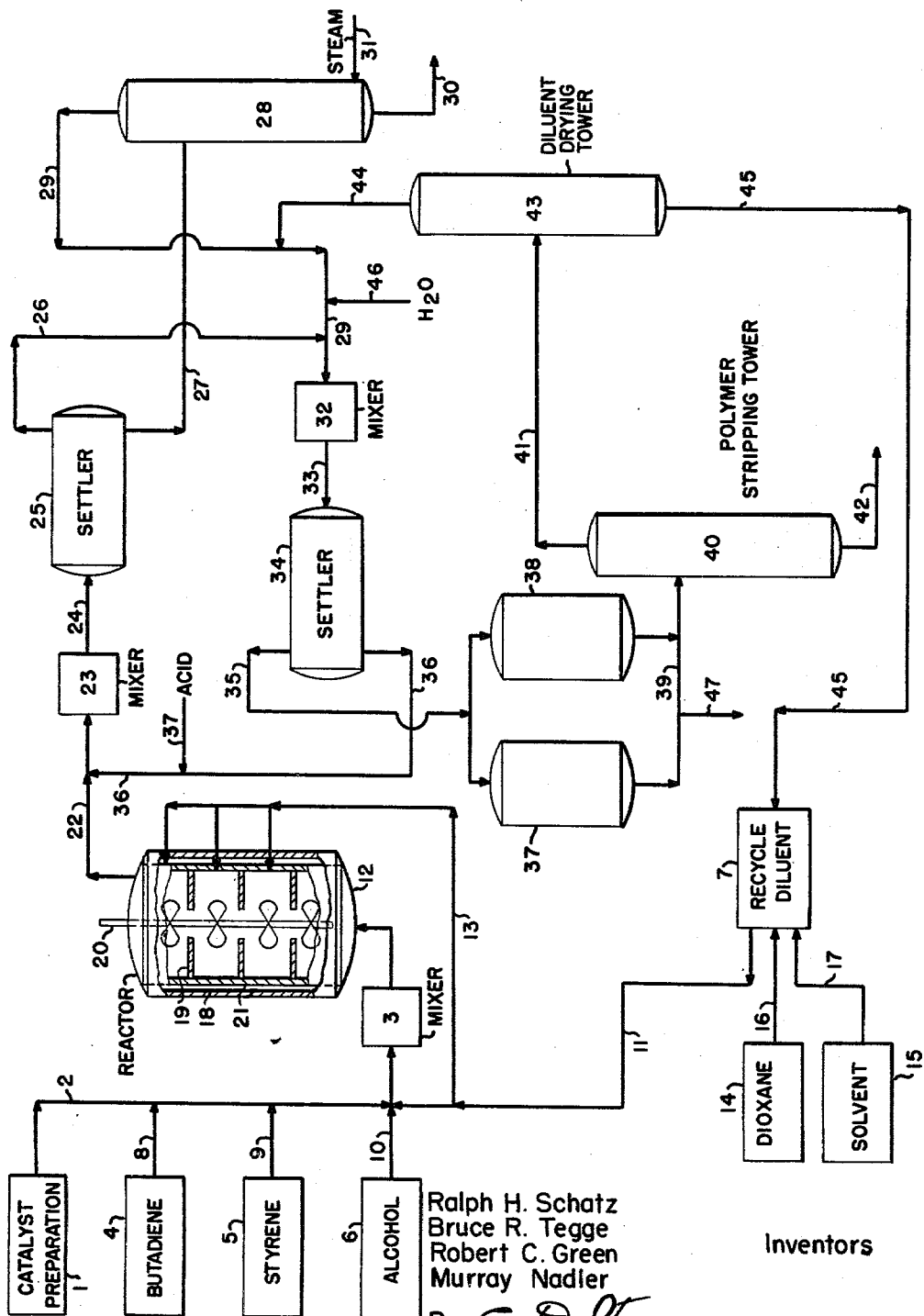

3,197,519
REMOVAL OF ALKALI METAL FROM LIQUID HYDROCARBON POLYMERS
Ralph H. Schatz, Westfield, Bruce R. Tegge, Madison, Robert C. Green, Rahway, and Murray Nadler, Morristown, N.J., assignors to Esso Research and Engineering Company, a corporation of Delaware
Filed Aug. 27, 1962, Ser. No. 219,506
5 Claims. (Cl. 260—669)

This invention relates to a method for the removal of alkali metals from viscous hydrocarbon liquids. The invention relates more particularly to the removal of a finely dispersed alkali metal from the reaction product obtained by the polymerization of an unsaturated hydrocarbon, particularly a conjugated diolefin such as 1,3-butadiene with or without other copolymerizable monomers, e.g., vinyl aromatics such as styrene or its homologues.

It is known to polymerize various unsaturated hydrocarbons such as olefins or diolefins in the presence of alkali metals or organic compounds thereof such as their alkyl derivatives to produce polymers of high molecular weight such as resins, rubbery materials, drying oils, and the like.

The products obtained by the above polymerization reactions contain the alkali metal or soluble forms thereof dispersed or dissolved therein, and these must be removed prior to use in order to avoid the normal hazards due to the presence of free metal and to avoid the effects of alkalinity if the product comes into contact with water. Furthermore, the curing rates of rubber-like compounds are increased by the presence of sodium or other alkali metal, and liquid polymeric drying oils are rendered cloudy and their use in coating compositions is hindered. In addition the electrical properties of cured laminates are inferior when the sodium content is above 70 p.p.m.

It has now been found that liquid polymerization products obtained from unsaturated organic compounds by the use of alkali metal catalysts may be treated to remove the alkali metal catalyst by washing the liquid product with large quantities of water containing a small amount of acid in an integrated process as described below.

The invention is particularly applicable to the preparation of drying oils by the polymerization of butadiene or the copolymerization of butadiene-styrene mixtures. In accordance with this process butadiene-1,3 is polymerized alone or 50 to 95 parts by weight of butadiene-1,3 are copolymerized with 5 to 50 parts by weight of a vinyl aromatic, such as styrene, in the presence of 0.5 to 10 parts by weight (based on monomers) of an alkali metal catalyst, such as sodium; other alkali metals such as potassium, lithium, caesium or rubidium may be used. The polymerization is carried out in a reaction diluent at a temperature ranging from 25° to 105° C., preferably between 40° and 85° C., either batchwise or in a continuous process. Materials used as diluents in the polymerization are inert hydrocarbons which remain liquid under the reaction conditions employed. Diluents boiling between about —15° and 200° C. are therefore suitable. The diluents are employed in amounts ranging from 50 to 500, preferably 100 to 200, parts per 100 parts of monomers.

It is usual to employ about 10–40 parts of an ether promoter per 100 parts of monomers. It is also possible to employ the ether as the sole diluent in the process in which case the larger quantities as described above are used. The use of the ethers are highly desirable since they improve the reproducibility of the process, shorten the initial induction period, control the product molecular weight, and are particularly effective in producing a substantially colorless product. Particularly suitable ethers are dioxane and diethyl ether.

It is also desirable to include 1 to 35 parts by weight of an alcohol based on 100 parts by weight of catalyst in the recipe to activate the catalyst. Suitable alcohols include methanol, isopropanol, normal pentanol, and the like.

The process of the present invention is particularly applicable to the multi-stage continuous process described and claimed in U.S. Patent No. 2,791,618, issued May 7, 1957, in the name of James E. Moise et al.

According to the present invention the reactor effluent is immediately washed with acidified water containing enough ether to prevent any of the ether in the effluent from being extracted into the water phase. The water phase from the washing step which now contains all of the alkali metal salts is introduced into a distillation column and stripped with open steam or reboiled to separate overhead an ether-water mixture approaching the azeotropic composition. The ether-water mixture is diluted with additional water to the desired composition and recycled to the washing step. The polymer solution from the washing operation, though essentially free of alkali metal catalyst, is yellow in color, hazy and often contains traces of gel particles which cause imperfections in surface coating applications. It has been determined that when films of the washed reactor product are laid down on 5" x 7" steep panels (D panels) and baked, the presence of more than 10 eyeholes per panel indicates a product of unsatisfactory quality. The addition of a silicone "anti eyeholing agent" has been found to eliminate "eyeholing" provided the product initially does not give more than 10 eyeholes per D panel (5 x 7 in.) or 5 eyeholes per Q panel (4 x 6 in.). However, the use of a silicone "anti eyeholing agent" is not the preferred technique. The washed polymer in accordance with an additional feature of this invention is trickled through a fixed bed of fuller's earth, Attapulgus or other clay to further purify the product. This produces colorless, gel-free polymer.

The clay bed is regenerated periodically, in situ, with hot naphtha. About four weights of polymer per weight of clay can be treated before regeneration is required. Valuable diluent and polymer left in the bed are recovered by flushing the bed with cold naphtha before regenerating or discarding the bed.

The polymer solution from the clay treating beds is stripped to remove solvent and ether which are dried and recycled to the polymerization reactor.

It is therefore one object of this invention to remove finely dispersed alkali metal from a hydrocarbon liquid.

It is another object of this invention to remove alkali metal alkyls and other similar highly reactive and soluble compounds of alkali metals from inert liquids.

It is a further object of this invention to polymerize an unsaturated organic compound in the presence of a catalytically active form of an alkali metal and subsequently recover a resulting polymeric material free from said alkali metal.

Other objects and advantages of this invention will become apparent to one skilled in the art from the accompanying disclosure and discussion when read in connection with the accompanying drawing which is a schematic illustration of one method for carrying out the invention in which the ether is present during the water washing.

Referring now to the drawing, a finely divided suspension of alkali metal catalyst, for example, sodium in naphtha, from catalyst preparation vessel 1, is introduced by line 2 into mixer 3. Simultaneously butadiene from tank 4, styrene from tank 5, alcohol from tank 6, and recycle diluent from tank 7 are passed by lines 8, 9, 10, and 11 respectively, into mixer 3 and introduced into the lowermost stage of reactor 12. Recycle diluent from tank 7 is introduced through line 13 to each of the second and succeeding stages of the reactor as needed. Dioxane from tank 14 an naphtha solvent from tank 15 are introduced as makeup to the recycle diluent in tank 7 through lines 16 and 17, respectively.

The reactor itself consists of a large vessel 12 surrounded by cooling jacket 18 and divided into stages by means of horizontal baffles 19. A vertical shaft 20 bearing blades 21 is disposed centrally in vessel 12 as an agitator. Polymerization occurs in reactor 12 and the viscous polymer solution passes from stage to stage by overflowing between the baffles 19. The polymer solution passes from the reactor by line 22 to mixer 23 where it is contacted with a mixture of water and dioxane from line 36 and acid from line 37, in a ratio of about one-tenth to one volume of water and dioxane per volume of polymer solution.

Acids which may be used to acidify the aqueous ether wash mixture include hydrochloric, sulfuric, acetic, carbonic, hydrofluoric and the like. However, preferred acids are those which are volatile at the polymer stripping temperature of about 175° C. so that residual amounts of acid in the polymer-hydrocarbon-ether phase will be removed from the polymer along with hydrocarbon and ether in the polymer stripping operation.

The amount of dioxane mixed with the water is sufficient to prevent any dioxane from being washed out of the effluent flowing in line 22. The mixture of acidified water and polymer solution from mixer 23 is passed by line 24 to settling drum 25. After complete settling has taken place, usually in one to two hours, the spent wash water leaves settler 25 through line 27 and is passed to dioxane stripping tower 28 where it is stripped with open steam introduced through line 31. A water-dioxane mixture approaching the azetropic composition is removed overhead through line 29 and recycled to mixer 32 associated with the second washing stage where it is diluted with water introduced through line 46 and passed seriatim through settlers 34 and 25. Water containing alkali metal salts in solution which have been washed out of the polymer is withdrawn in from the bottom of tower 28 through line 30 and discarded.

The washed polymer solution in naphtha and dioxane withdrawn from settler 34 through line 35 is passed to clay towers 37 and 38 arranged in parallel. In these towers the yellowish polymer is precolated through clay such as fuller's earth or Attapulgus or other clay to remove color bodies and gel particles and produce a colorless gel-free product which yields films which are free from surface imperfections. The purified polymer solution is then passed by line 39 to stripping tower 40 having a bottoms temperature of 175° C. where naphtha and dioxane are stripped overhead under vacuum and withdrawn through line 41. Polymer products is withdrawn through line 42 to storage.

The mixture of naphtha and dioxane flowing in line 41 is passed to the mid-point of azetropic drying tower 43. The bottom of this tower is maintained at 110° C. An azeotrope of water and dioxane is taken off overhead through line 44. The overhead stream 44 is combined with the dioxane-water mixture from tower 28 and thence flows to mixer 32 by line 29 for use in washing the polymer solution from settler 25. A mixture of dioxane and naphtha is removed through line 45 and returned to the recycle diluent storage tank 7 for reuse. If desired, polymer product can be withdrawn from towers 37 and 38 through line 47 to storage.

The advantages of the invention will be better understood from a consideration of the following experimental data which are given for the sake of illustration, but without intention of limiting the invention thereto.

EXAMPLE I

The effluent from reactor 12 in the drawing was blended with naphtha in an agitated vessel, to give a blend having the following composition:

Polymer _____ 15 wt. percent.
Naphtha _____ 80 wt. percent (ca.).
Dioxane _____ 5 wt. percent (ca.).
Sodium _____ 1.1–1.5 wt. percent on polymer.

This polyemer blend was fed through a steam heated exchanged where it was heated to the required washing temperature. Well water was heated in another steam heat exchanger and then mixed with a metered flow of dry hydrogen chloride just before contacting the hydrocarbon feed. The hydrochloric acid-hydrocarbon mixture was then fed into a dispersator vessel where contacting of acid and sodium took place.

The HCl to sodium mole ratio in the feed ranged from 1.27 to 2.35. For a 1/1 hydrocarbon to aqueous volume ratio the HCl concentration in the aqueous acid ranged from 0.2 to 0.7 wt. percent.

Contacting of acid and sodium was carried out in a 25 gallon glass lined vessel at 180°–210° F. Contact times ranged from 15 to 25 minutes. The vessel was agitated with a 4″ diameter dispersator driven at 3450 r.p.m. by a 3.0 hp. drive.

From the dispersator vessel the mixture overflowed into an insulated settler where separation of the hydrocarbon phase from the aqueous phase occurred.

Separation of aqueous phase from hydrocarbon phase was accomplished in two 168 gallon insulated vessels. The settlers were tilted at an angle of 5° from horizontal with feed entering the high end and product overflowing from the low end. Water was discharged from the bottom of the low end to the sewer. The water-hydrocarbon interface level was maintained at 3 to 5 inches from bottom discharge point in the first settler. This left approximately 95% of the liquid volume for hydrocarbon separation. The second settler was completely flooded with overflow from the first settler and the water that settled out in this vessel was drawn off periodically.

Settling temperatures ranged from 170 to 205° F. and pressure on the settlers varied from 5 to 10 p.s.i.g. The hydrocarbon overflow from the first settler was fed directly into a second settler or directly to product storage.

The following data were obtained:

*Table 1*

| Run Length, Hrs | 13 | 9¾ | 24¾ | 23 |
|---|---|---|---|---|
| Hydrocarbon Feed Rate, Gal./Hr | 48.5 | 49.3 | 46.5 | 32.0 |
| Polymer Feed Rate, Lb./Hr | 42.5 | 43.8 | 41.7 | 28.5 |
| Water Feed Rate, Gal./Hr | 44.6 | 44.6 | 43.1 | 27.3 |
| HCl Feed Rate (99.8%), Lbs./Hr | 2.29 | 2.45 | 1.96 | 0.83 |
| Hydrocarbon/Water Vol. Ratio | 1.09 | 1.10 | 1.08 | 1.17 |
| HCl Feed/Sodium Feed, Mole Ratio | 2.35 | 2.44 | 2.02 | 1.27 |
| Hydrocarbon Feed Analyses: | | | | |
|   Polymer, Wt. Percent | 13.7 | 13.7 | 13.8 | 13.8 |
|   Polymer Viscosity, Poise [1] | 0.8 | 0.8 | 0.8 | 0.8 |
|   Sodium, Wt. Percent on Polymer [2] | 1.45 | 1.45 | 1.45 | 1.45 |
|   Naphtha, Wt. Percent of Feed [2] | 82.2 | 82.2 | 82.2 | 82.2 |
|   Dioxane, Wt. Percent of Feed [2] | 4.1 | 4.1 | 4.1 | 4.1 |
|   Polymer Color, Gardner | 2–3 | 2–3 | 2–3 | 2–3 |
|   Appearance | Yellow | Yellow | Yellow | Yellow |

See footnotes at end of table.

Table I—Continued

| Run Length, Hrs | 13 | 9¾ | 24¾ | 23 |
|---|---|---|---|---|
| Mixing Contact Time, Minutes | 16.1 | 16.0 | 16.7 | 25.3 |
| First Settler: | | | | |
| Hydrocarbon, Percent of Settler Volume | 94 | 94 | 96 | 96 |
| Hydrocarbon Holding Time, Hrs | 3.06 | 3.00 | 3.3 | 4.8 |
| Settler Temperature, °F | 186 | 189 | 204 | 198 |
| Settler Pressure, p.s.i.a | 25 | 20 | 26 | 23 |
| Second Settler: | | | | |
| Hydrocarbon, Percent of Settler Volume | | | 100 | 100 |
| Hydrocarbon Holding Time, Hrs | | | 3.4 | 4.9 |
| Settler Temperature, °F | | | 202 | 194 |
| Settler Pressure, p.s.i.a | | | 26 | 22 |
| First Settler Product Analyses: | | | | |
| Polymer, Wt. Percent [4] | 14.8 | 14.6 | 15.2 | 15.5 |
| Polymer Viscosity, Poises [1] | 0.8 | 0.8 | 0.8 | 0.7 |
| Sodium, p.p.m. on Polymer | 171 | 18 | 23 | 22 |
| Color, Gardner | | | 1 | <1 |
| Water, Liquid Vol. Percent | 3.9 | 3.0 | 3.0 | 4.3 |
| Metals Content, p.p.m. Total [3] | <25 | <25 | <25 | <25 |
| Acid No | 1.1 | 0.8 | 0.5 | 0.6 |
| Appearance | Yellow | Yellow | Light Yellow | Light Yellow |
| Second Settler Product Analyses: | | | | |
| Polymer, Wt. Percent [4] | | | 14.7 | 14.5 |
| Polymer Viscosity, Poises [1] | | | 0.8 | 0.7 |
| Sodium, p.p.m. on Polymer | | | 12 | 10 |
| Color, Gardner | | | 1 | <1 |
| Water, Liquid Vol. Percent | | | 4.0 | 4.3 |
| Metals Content, p.p.m. Total [3] | | | <25 | <25 |
| Appearance | | | Light Yellow | Light Yellow |
| Feed Water Analyses: | | | | |
| NVM, Wt. Percent | 0.05 | 0.05 | 0.07 | 0.04 |
| pH | 7.7 | 7.2 | 7.6 | 7.8 |
| First Settler Water Analyses: | | | | |
| NVM, Wt. Percent | 0.6 | 1.05 | 0.75 | 0.55 |
| pH | 1.7 | 1.5 | 1.7 | 1.8 |
| Emulsion Phase (cuff): | | | | |
| Vol. Percent of Product | 2.0 | 1.0 | 1.5 | 1.2 |
| NBM, Wt. Percent | 3.5 | 4.2 | 4.0 | 4.0 |
| Polymer Losses in Cuff, Wt. Percent | 0.6 | 0.35 | 0.42 | 0.38 |
| Overall Polymer Losses, Wt. Percent of Feed | 6.0±4.0% | 0±5% | 0±2.0% | |

[1] Gardner Viscosity at 50% NVM in Varsol.
[2] Calculated values based on feed blend analyses.
[3] Sum of all metals except sodium. Metals contents were negligible within the accuracy of the analyses.
[4] NVM including water in hydrocarbon.

The above data show that sodium neutralization by washing with aqueous HCl was excellent. The acid requirements were very low after lined out conditions were attained.

In the initial startup a large fraction of the HCl feed was consumed by reaction with metal particles and rust in the piping and vessels. As a result, inadequate neutralization was obtained and high polymer losses occurred from emulsion formation. The emulsion formed during this period contained a high concentration of metal chlorides as witnessed by the colors in the product. After this initial run which undoubtedly cleaned the rust and free metal particles from the equipment, the problems of HCl losses and metals contamination were eliminated. Metals content in the product of all subsequent runs were negligible within the accuracy of the analyses.

Material balances were excellent for all of the runs and polymer losses were negligible for 48 hours' operation during which feed rates ranged from 0.3 to 0.5 ton per day polymer. Losses calculated from an approximated volume of cuff in the product were about 0.4 wt. percent of feed. Polymer losses in the water phase were negligible also. Continuous separation of hydrocarbon and aqueous phase was adequately accomplished throughout the operations.

EXAMPLE II

Samples of the water-washed product of Example I were vacuum stripped at 340° F. and percolated through various adsorbents and a comparison was made of the quality of baked films obtained from each of these percolations and from samples which had not been percolated. The following results were obtained.

| Run | Absorbent | Bed Volume, cc. | NVM | Vol. Liters | Na | Color | Film |
|---|---|---|---|---|---|---|---|
| 1 | Charcoal | 500 | 15 | | | | Charcoal in product. |
| 2 | Porocel | 500 | 15 | 0–1 | 6 | 1.5 | Pass. |
| 3 | do | 500 | 15 | 1–2 | | 1.0 | Do. |
| 4 | do | 500 | 15 | 2–3 | 33 | 2.0 | Do. |
| 5 | Fuller's earth | 500 | 15 | 0.1 | 1 | >1 | Do. |
| 6 | do | 500 | 15 | 1–2 | | 1 | Do. |
| 7 | do | 500 | 15 | 2–3 | 2 | >1 | Do. |
| 8 | None | | | | 46 | 5 | Fail. |
| 9 | do | | | | 18 | 3 | Do. |
| 10 | do | | | | 179 | 5 | Do. |
| 11 | do | | | | 63 | 3 | Do. |

From the above description it is evident that free alkali metal or its salts may be removed from a hydrocarbon polymer containing same as a contaminant from synthesis by washing with large volumes of acidified water without encountering any emulsion problems.

As will be evident by those skilled in the art, various modifications of this invention can be made or followed in light of the foregoing disclosure and discussion without departing from the spirit or scope of the disclosure or claims.

The nature of the present invention having been thus fully set forth, what is claimed as new and useful and desired to be secured by Letters Patent is:

1. In a process for polymerizing a conjugated diolefin in the presence of a hydrocarbon solvent for the polymer, an ether promoter, and an alkali metal catalyst, the improvement which comprises recovering a solution of polymer in solvent containing alkali metal impurities; mixing said polymer solution with an acidified aqueous solution of said ether in a ratio of about $\frac{1}{10}$ to 1 volume of acidified water and ether per volume of polymer solution; settling said mixture to form a lower layer containing ether, water, and salts of said alkali metal impurities, and an upper layer containing polymer dissolved in hydrocarbon and ether, free of alkali metal impurities; separating an ether-water mixture approaching the azeotropic composition from water containing alkali metal impurities in said lower layer by distillation; diluting the separated ether-water mixture with alkali-metal-free water, acidifying the solution, and employing the resulting mixture as the acidic aqueous ether solution in said mixing step; separating hydrocarbon-ether solvent from polymer in said upper layer by flash distillation; drying said hydrocarbon-ether diluent and recycling said hydrocarbon-ether solvent to said polymerization step.

2. Process according to claim 1 in which the solution of polymer in hydrocarbon and ether is percolated through a bed of adsorbent clay prior to distilling off the hydrocarbon and ether.

3. Process according to claim 2 wherein a plurality of stages of contacting are employed, and the polymer-ether-hydrocarbon phase and the aqueous ether phase are passed from stage to stage in a countercurrent fashion.

4. Process according to claim 2 in which the ether is dioxane, the hydrocarbon solvent is naphtha, and the acid is hydrochloric, said acid being present in a range of 1.27 to 2.35 moles per mole of alkali metal present.

5. Process according to claim 2 in which the ether is dioxane, the hydrocarbon solvent is naphtha, and carbon dioxide is used to acidify the aqueous ether mixture.

References Cited by the Examiner
UNITED STATES PATENTS

| | | | |
|---|---|---|---|
| 2,631,175 | 3/53 | Crouch | 260—669 |
| 2,791,618 | 5/57 | Moise et al. | 260—669 |
| 2,952,683 | 9/60 | Warner | 260—669 |

ALPHONSO D. SULLIVAN, *Primary Examiner.*